Patented June 2, 1931

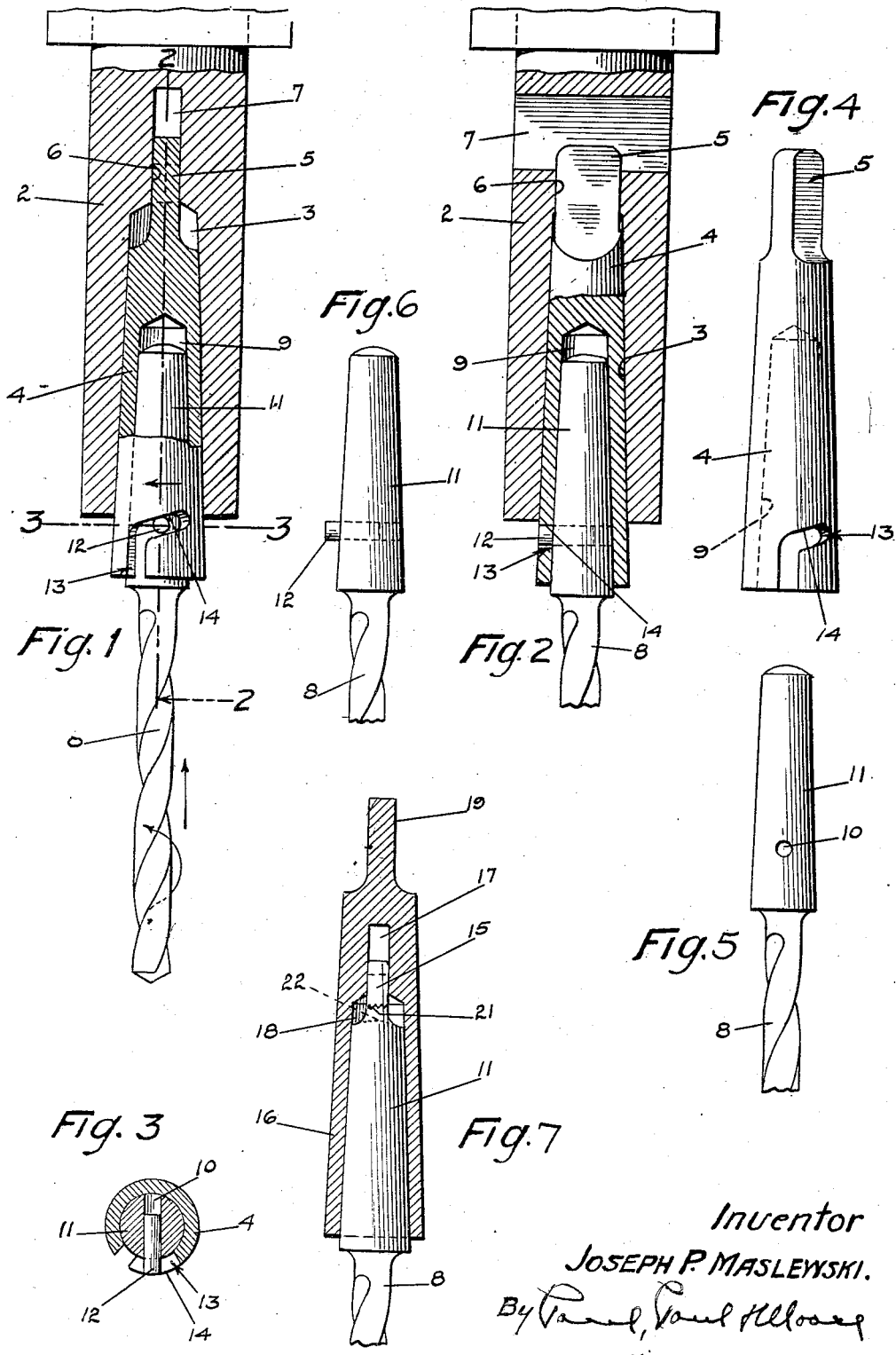

1,808,051

UNITED STATES PATENT OFFICE

JOSEPH P. MASLEWSKI, OF MINNEAPOLIS, MINNESOTA

DRILL SUPPORT

Application filed January 16, 1930. Serial No. 421,193.

This invention relates to an improved drill support particularly adapted for use in connection with a drill press to support the drill in the usual driving member thereof.

Drills, particularly of the larger sizes, are usually provided with a tapered shank adapted to be inserted into a correspondingly tapered socket provided in a sleeve which, in turn, is adapted to be supported in the usual driving member of the drill press. To prevent the drill from relatively rotating in the tapered sleeve, the tapered shank of the drill is usually provided with a terminal tang or tongue adapted to be received in a recess whereby the drill shank is positively held against relative rotation within the drill sleeve, when the latter is rotated. The drill supporting sleeve is also nonrotatably supported in the driving member of the drill press. It frequently happens that when a drill is subjected to a heavy load, or is forced too quickly into the work, that the usual tang provided on its shank is twisted or broken off, thereby permitting the tapered driving sleeve to relatively rotate without imparting rotary movement to the drill supported therein. The drill must then be discarded or repaired by welding a new tang to the shank thereof. To thus repair a broken tang, requires considerable time and therefore cannot always be done at the time the tang breaks, thereby usually making it necessary to carry a large number of duplicate drills in stock so that a new one can be substituted, in case of breakage, without unnecessarily delaying the mechanic in his work.

It is an object of the present invention to provide means whereby when the terminal tang or tongue on a drill shank breaks off, the tapered drill shank may be quickly treated so that when again inserted into the sleeve, a positive driving connection will be obtained between the sleeve and the drill shank.

A further object of the invention is to provide a drill sleeve having an angular slot provided in the wall thereof adapted to receive a pin secured in the broken or damaged drill shank, and the slot being so shaped that when a drill shank is inserted into the tapered socket in the sleeve, and the latter is rotated, the pin in the drill shank will engage a wall of the slot and cause the shank to be forced tightly into the sleeve socket and, at the same time, positively prevent the drill shank from relatively rotating in the sleeve.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a vertical view partially in section showing the invention applied to the driving member of a drill press and supporting a drill therein;

Figure 2 is a vertical sectional view on the line 2—2 of Figure 1;

Figure 3 is a sectional plan view on the line 3—3 of Figure 1;

Figure 4 is a view showing the drill supporting sleeve removed from the driving member of the drill press;

Figure 5 is a view showing a drill shank with its terminal tang removed and an aperture drilled therein adapted to receive a pin;

Figure 6 is a view similar to Figure 5, but showing a driving pin secured in the aperture provided in the drill shank; and Figure 7 is a view showing a drill supporting sleeve with a drill shank mounted therein and indicating the place where the tang of the drill shank usually breaks off when subjected to an overload.

In the selected embodiment of the invention here shown, there is illustrated in Figures 1 and 2, a driving member 2, of an ordinary drill press, provided with a tapered socket 3 adapted to receive a tapered sleeve 4 having a driving tang 5 provided at its upper end adapted to be received in a correspondingly shaped recess 6, provided in the bottom of the socket 3. A transverse slot 7 is provided in the driving member 2 and connects with the recess 6. The tang 5 of the sleeve 4 is adapted to project into the slot 7 so that a tool may be inserted therein for the purpose of disengaging the sleeve from the tapered socket 3, in a driving member 2.

A feature of this invention resides in the means provided for detachably securing the drill 8 to the tapered sleeve 4. As shown in Figures 1, 2, and 4, the sleeve 4 is provided with a tapered socket 9 adapted to receive the tapered shank 11 provided at one end of the drill 8. A pin 12 is secured in the shank 11 of the drill and is adapted to be received in a bayonet slot 13 provided in the wall of the sleeve 4, as best shown in Figure 1. The bayonet slot 13 has an inclined wall portion 14 adapted to engage the pin 12, when the drill sleeve 4 is rotated in the direction indicated in Figure 1, and cause the drill shank 11 to be tightly forced into the socket 9, and, at the same time, to positively prevent relative rotation of the shank with respect to the sleeve 4.

By the employment of a tapered driving sleeve 4, having a bayonet slot 13 in the wall thereof, as above described, when the usual tang 15 provided upon the drill shank 11, as indicated in Figure 7, is damaged or broken off, the mechanic will insert the sleeve 4 into the socket 3 of the driving member 2 and then drill a hole or socket 10 in the shank of the drill as shown in Figure 5, and insert the pin 12, as shown in Figure 6, after which the drill may be inserted into the socket 9 and the drill operated in the usual manner. It will thus be seen that by the use of this novel driving sleeve, when the tang on a drill shank is accidentally broken off or damaged, and a pin 12 is secured in the broken drill shank, as hereinbefore stated, the drill may be used in the usual manner, the slot and pin positively preventing the drill shank from relatively rotating in the sleeve, even though the drill be subjected to heavy-duty work.

Figure 7 illustrates a driving sleeve 16, of ordinary construction, having a drill shank inserted therein, and the usual tang 15 provided on the end of the drill shank received in a recess 17, which preferably extends laterally through the sleeve so that the drill shank may be disengaged from the tapered socket 18 in the sleeve 16, when it is desired to remove the drill therefrom. The sleeve 16 is shown provided with the usual driving tang 19 adapted to be received in the recess member 6 provided in the driving member 2 of the drill press. The broken line 21 in Figure 7, indicates the place where the tang 15 provided in the usual drill shank usually breaks off. When this occurs, the end of the drill shank is preferably ground off to the dotted line 22 indicated in Figure 7, after which the pin 12 is secured in the shank 11 of the drill and the shank inserted into the socket 9 provided in the sleeve 4.

In the drawings, I have shown the invention applied to the driving member of a drill press, but it is to be understood that it may also be applied to other apparatus such, for example, as the usual driving member of a lathe.

I claim as my invention:

1. A drill supporting sleeve having a tapered socket therein provided with an angular slot in its wall, a tapered shank adapted to be received in said socket, and a pin received in said shank and adapted to be received in said slot to detachably secure the shank in the socket, said slot having an inclined wall adapted to be engaged by said pin, whereby rotation of said sleeve and drill in one direction will cause said shank to be tightly secured to said sleeve.

2. A drill supporting sleeve provided with a tapered socket, a wall of said sleeve having an angular slot therein open at one end, a drill having a tapered shank adapted to be received in said socket, and a projection on said shank adapted to be received in said slot and to engage an inclined wall thereof whereby the shank is drawn tightly into said socket and secured therein in non-rotative relation.

In witness whereof, I have hereunto set my hand this 7th day of January, 1930.

JOSEPH P. MASLEWSKI.